United States Patent
Sundholm et al.

(10) Patent No.: US 9,744,987 B2
(45) Date of Patent: Aug. 29, 2017

(54) WORM SHAFT SUBASSEMBLY

(71) Applicant: Steering Solutions IP Holding Corporation, Saginaw, MI (US)

(72) Inventors: Brad S. Sundholm, Bay City, MI (US); Jason Rutkiewicz, Freeland, MI (US); Nik Von Matt, Midland, MI (US); Steve Klein, Munger, MI (US); Donald J. Smith, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 15 days.

(21) Appl. No.: 14/699,591

(22) Filed: Apr. 29, 2015

(65) Prior Publication Data

US 2016/0318543 A1    Nov. 3, 2016

(51) Int. Cl.
| | |
|---|---|
| *B62D 5/04* | (2006.01) |
| *F16H 55/24* | (2006.01) |
| *F16H 57/00* | (2012.01) |
| *F16H 57/022* | (2012.01) |
| *B62D 3/12* | (2006.01) |
| *F16H 57/12* | (2006.01) |
| *F16H 57/021* | (2012.01) |

(52) U.S. Cl.
CPC .............. *B62D 5/0409* (2013.01); *B62D 3/12* (2013.01); *F16H 55/24* (2013.01); *F16H 57/0006* (2013.01); *F16H 57/022* (2013.01); *F16H 57/12* (2013.01); *F16H 2057/0213* (2013.01); *F16H 2057/0221* (2013.01); *F16H 2057/126* (2013.01)

(58) Field of Classification Search
CPC ......... B62D 5/0409; B62D 3/12; F16H 57/12; F16H 2057/126

USPC ........................................................ 180/444
See application file for complete search history.

(56) References Cited

U.S. PATENT DOCUMENTS

| | | | |
|---|---|---|---|
| 6,044,723 A | 4/2000 | Eda et al. | |
| 6,523,431 B2 | 2/2003 | Ozsoylu et al. | |
| 7,490,695 B2* | 2/2009 | Segawa ............... | B62D 5/0409 180/444 |
| 8,459,402 B2* | 6/2013 | Hamakita ............ | B62D 5/0409 180/443 |

(Continued)

FOREIGN PATENT DOCUMENTS

| | | |
|---|---|---|
| EP | 1335154 A1 | 8/2003 |
| EP | 2722254 A1 | 4/2014 |

OTHER PUBLICATIONS

EP Extended Search Report Issued on Aug. 19, 2016; EP Appl. No. 16166415.6; 8 pages.

*Primary Examiner* — Tony Winner
*Assistant Examiner* — Michael Stabley
(74) *Attorney, Agent, or Firm* — Cantor Colburn LLP

(57) ABSTRACT

According to one exemplary embodiment of the present invention a worm shaft subassembly for supporting a worm shaft is provided. The worm shaft has a worm shaft radial load, a worm shaft axial load, and a worm shaft axial travel. The worm shaft subassembly includes at least one damping member to support the worm shaft axial load. The at least one damping member has at least one damping member axial load. The at least one damping member limits the worm shaft axial travel. The worm shaft subassembly also includes a bearing to support the worm shaft radial load and the at least one damping member axial load.

20 Claims, 4 Drawing Sheets

(56) References Cited

U.S. PATENT DOCUMENTS

| | | | | |
|---|---|---|---|---|
| 8,549,945 B2* | 10/2013 | Rho | ............... | B62D 5/0409 |
| | | | | 384/256 |
| 8,567,553 B2* | 10/2013 | Hamakita | ............ | B62D 5/0409 |
| | | | | 180/443 |
| 8,667,858 B2* | 3/2014 | Fuechsel | ............. | B62D 5/0409 |
| | | | | 384/535 |
| 8,905,185 B2* | 12/2014 | Ko | ................ | B62D 5/0409 |
| | | | | 180/444 |
| 2009/0266640 A1* | 10/2009 | Oshima | .............. | B62D 5/04 |
| | | | | 180/444 |
| 2014/0352468 A1* | 12/2014 | Kim | ................ | F16H 25/24 |
| | | | | 74/409 |
| 2015/0107384 A1* | 4/2015 | Kwon | ............... | B62D 3/04 |
| | | | | 74/89.14 |
| 2015/0284024 A1* | 10/2015 | Moriyama | ........... | F16D 3/68 |
| | | | | 180/444 |
| 2015/0298733 A1* | 10/2015 | Moriyama | ........... | B62D 5/0409 |
| | | | | 180/444 |
| 2015/0360719 A1* | 12/2015 | Kang | ................ | F16H 57/021 |
| | | | | 384/222 |

\* cited by examiner

WORM SHAFT SUBASSEMBLY

FIELD OF THE INVENTION

The subject invention relates to a worm shaft subassembly and more particularly a worm shaft subassembly suitable for use in electric power steering units and systems.

BACKGROUND

In an Electric Power Steering (EPS) unit an electric motor drives a worm shaft and worm gear to provide assist torque to the turning of a steering shaft. This reduces the effort required to steer a vehicle. In certain applications, worm shaft bearings with axial lash are axially preloaded. This prevents or limits axial travel of the worm shaft to provide improved vehicle steering response.

However, adding axial preload forces to the worm shaft bearings with axial lash often imparts additional frictional forces for the worm shaft bearings and the steering system.

Accordingly, it is desirable to provide a worm shaft subassembly capable of imparting a greater preload to the worm shaft without the prior disadvantages.

SUMMARY OF THE INVENTION

According to one exemplary embodiment of the present invention a worm shaft subassembly for supporting a worm shaft is provided. The worm shaft has a worm shaft radial load, a worm shaft axial load, and a worm shaft axial travel. The worm shaft subassembly includes at least one damping member to support the worm shaft axial load. The at least one damping member has at least one damping member axial load. The at least one damping member limits the worm shaft axial travel. The worm shaft subassembly also includes a bearing to support the worm shaft radial load and the at least one damping member axial load.

In another exemplary embodiment of the present invention a method for supporting a worm shaft is provided. The worm shaft has a worm shaft radial load, a worm shaft axial load, and a worm shaft axial travel. The method comprises supporting the worm shaft axial load via at least one damping member, and limiting the worm shaft axial travel via the at least one damping member. Thereafter, the method includes supporting at least one damping member axial load via a bearing, and supporting the worm shaft radial load via the bearing.

In yet another exemplary embodiment of the present invention, an electric power steering system is provided. The electric power steering system comprises a steering shaft connected to handwheel at one end and a rack and pinion steering mechanism at an opposite end. A steering assist unit comprising an electric motor operated by a controller and driving a worm shaft is provided. A worm gear is interposed between the worm shaft and the steering shaft, the worm having worm teeth and the worm gear is fitted on the steering shaft. The worm shaft has a worm shaft radial load, a worm shaft axial load, and a worm shaft axial travel. The worm shaft includes a worm shaft subassembly. The worm shaft subassembly includes at least one damping member to support the worm shaft axial load. The at least one damping member has at least one damping member axial load. The at least one damping member limits the worm shaft axial travel. The worm shaft subassembly also includes a bearing to support the worm shaft radial load and the at least one damping member axial load.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DESCRIPTION OF THE EMBODIMENTS

Figure 1:
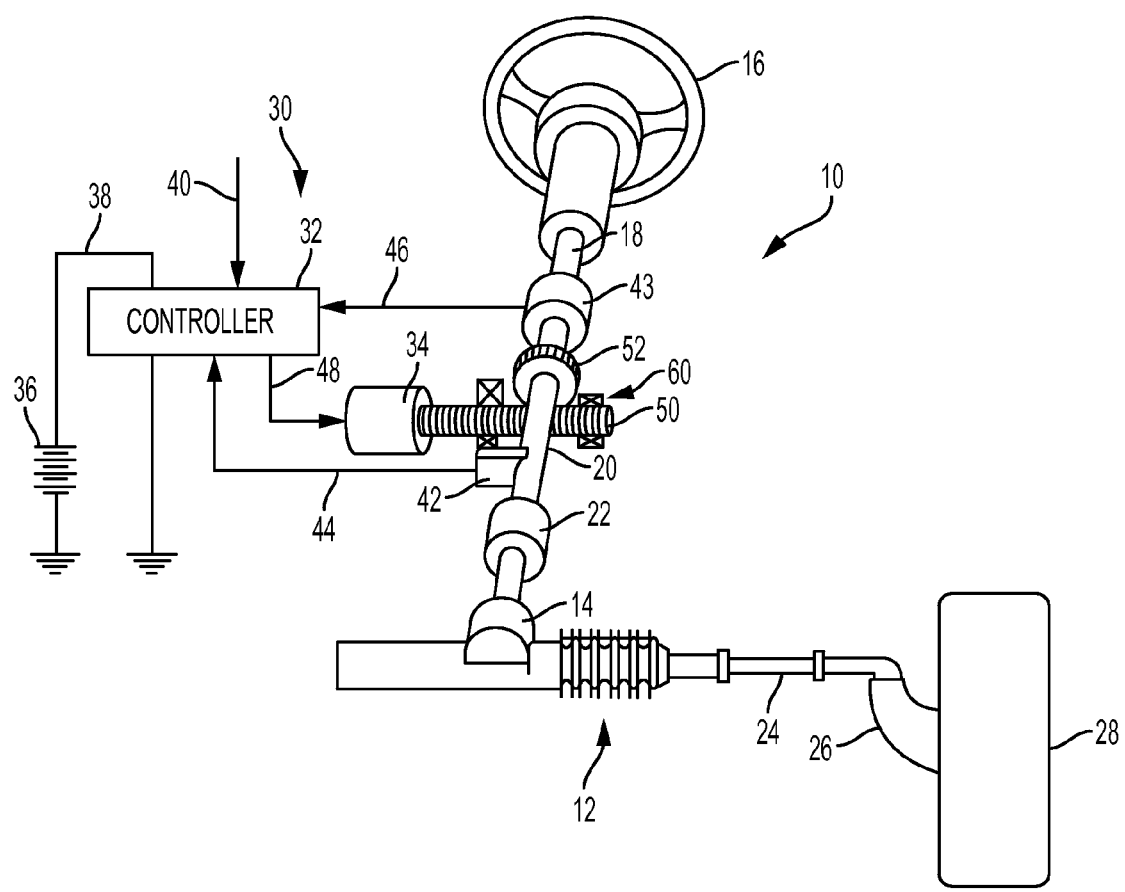
FIG. 1 is a schematic diagram of a power steering system in accordance with the invention.

Referring now to the Figures, where the invention will be described with reference to specific embodiments without limiting same, and in accordance with exemplary embodiments of the present invention, FIG. 1 shows an electric power steering (EPS) system 10 for a motor vehicle. The EPS system 10 includes a rack-and-pinion type steering mechanism 12 that is comprised of a toothed rack (not shown) and a pinion gear (not shown) located under a gear housing 14. A steering wheel 16 is coupled to an upper steering shaft 18. As the steering wheel 16 is turned, the upper steering shaft 18, which is connected to a lower steering shaft 20 and a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist torque is provided through a steering assist unit 30, which includes a controller 32 and an electric motor 34. The controller 32 is powered by a vehicle power supply 36 through a supply line 38. The controller 32 receives a signal indicative of the vehicle velocity on a signal line 40. Steering pinion gear angle is measured by a position sensor 42 and fed to the controller 32 through a line 44. As the steering wheel 16 is turned, a torque sensor 43 senses the torque applied to the steering wheel 16 by a vehicle operator. The torque sensor 43 may include a torsion bar (not shown) and a variable-resistance type of sensor (not shown) that outputs a variable resistance signal to the controller 32 through a line 46 in relation to the amount of twist on the torsion bar.

In response to the inputs on lines 40, 44 and 46, the controller 32 sends a command signal through a line 48 to the electric motor 34. The motor 34, in turn, supplies an assist torque to the steering system 10 through a worm shaft 50 and a worm gear 52, in order to provide a steering torque assist to the steering system 10 that supplements the steering force exerted by a vehicle operator. In certain embodiments, the worm shaft 50 experiences axial travel during operation. In an exemplary embodiment, the worm shaft 50 is supported by a worm shaft subassembly 60 to limit axial travel of the worm shaft 50.

Figure 2:
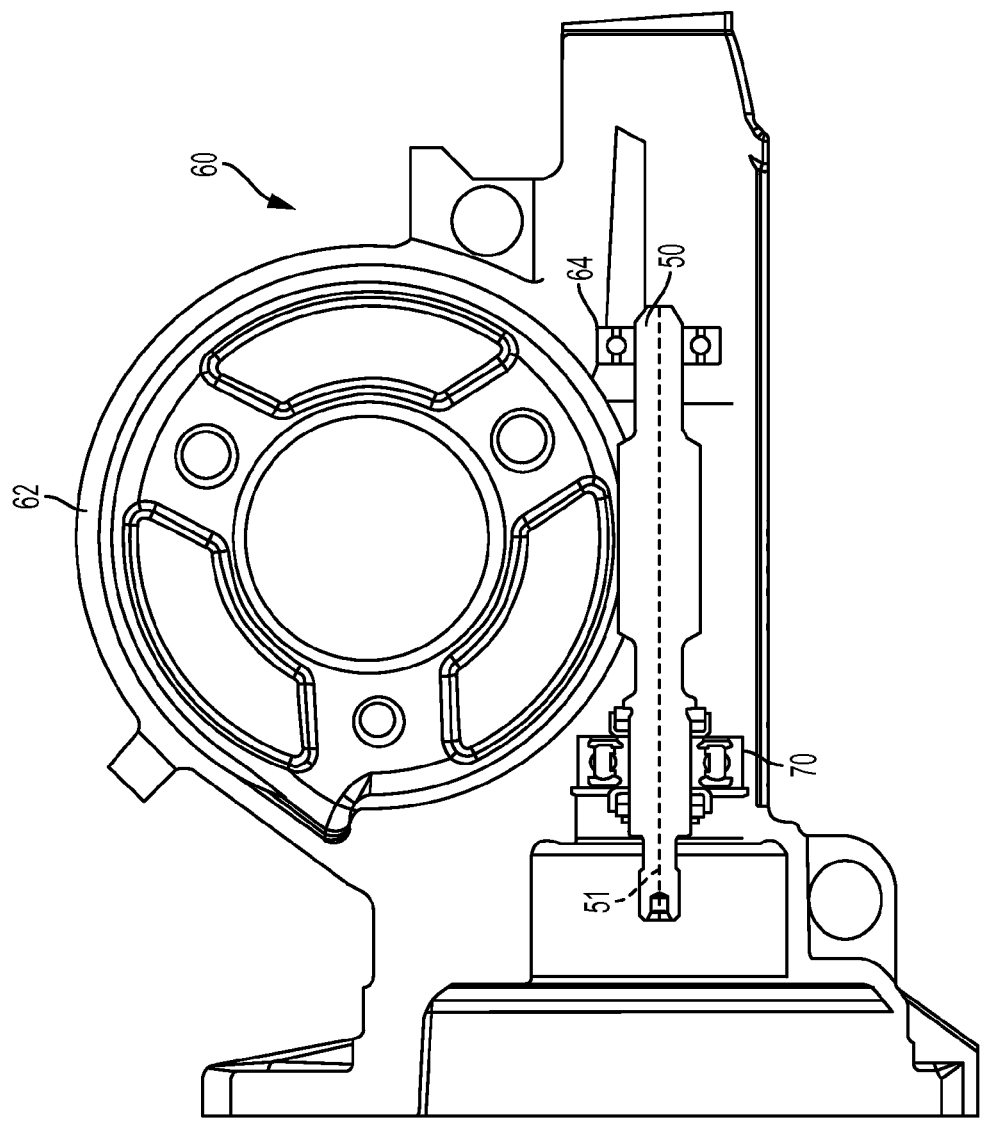
FIG. 2 is a pictorial view of a worm shaft subassembly suitable for use with a power steering system, such as the power steering system shown in FIG. 1.

Referring to FIG. 2, an exemplary embodiment of a worm shaft subassembly 60 is shown. In an exemplary embodiment, worm shaft subassembly 60 includes housing 62, preload assembly 70, and secondary bearing 64. In an exemplary embodiment, worm shaft subassembly 60 acts upon worm shaft 50 to preload worm shaft 50 and limit axial travel along worm axis 51. In an exemplary embodiment, housing 62 encloses or partially encloses worm gear 50, preload assembly 70 and secondary bearing 64. In an exemplary embodiment, preload assembly 70 and secondary bearing 64 are associated with and support worm gear 50. In certain embodiments, preload assembly 70 and secondary bearing 64 are supported by housing 62. In certain applications, on center torsional stiffness of steering systems is affected by worm shaft 50 axial travel along worm axis 51, gear turning torque, and the stiffness of gear teeth of worm shaft 50 and worm gear 52. In certain applications, it is desirable to limit axial travel of worm shaft 50 along worm axis 51. Advantageously, worm shaft subassembly 60 limits axial travel of worm shaft 50 along worm axis 51 without increasing friction within the steering system. By limiting axial travel of the worm shaft 50, a vehicle operator may experience stiffer and quicker steering response. Further, the steering system can have a lower assist mechanism zoning window due to a lower turning torque experienced compared to traditional steering systems.

Figure 3:
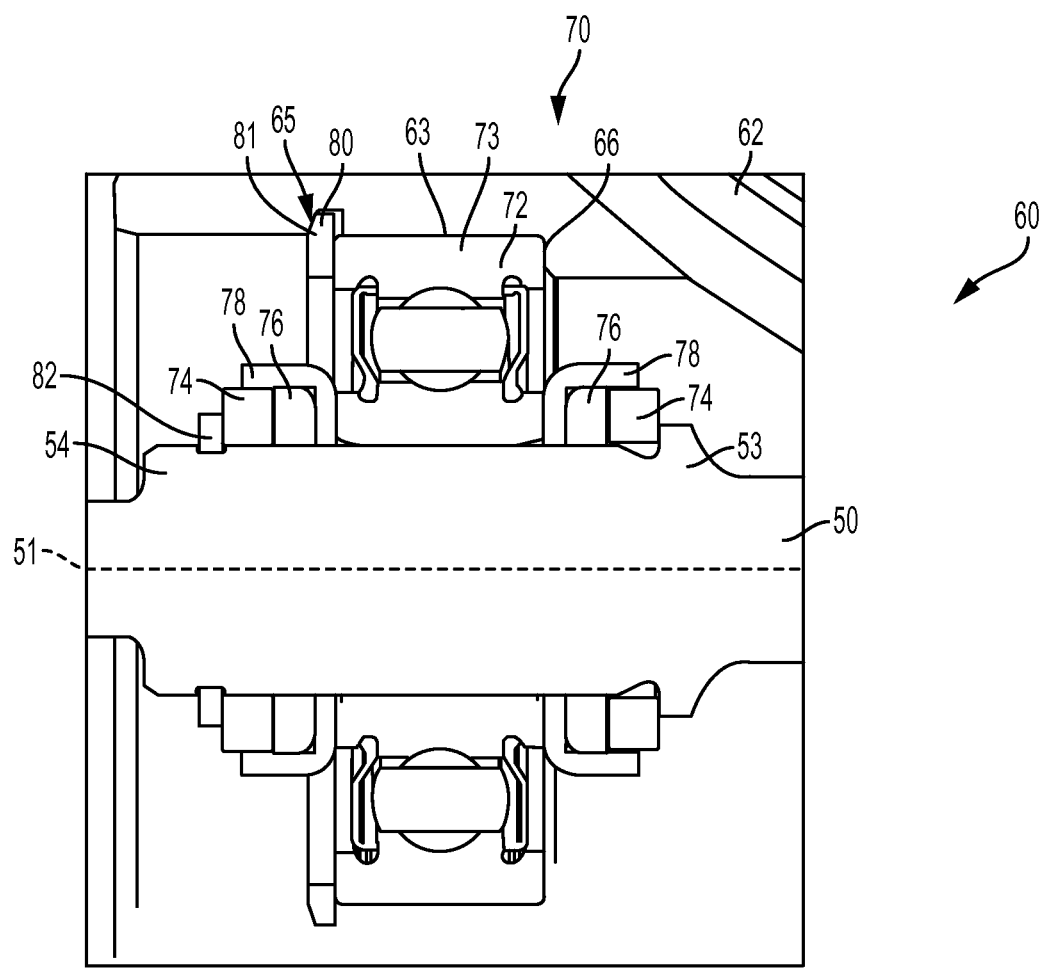
FIG. 3 is a pictorial view of a preload assembly of the worm shaft subassembly.

FIG. 3 shows a preload assembly 70 of the worm shaft subassembly 60. In an exemplary embodiment, preload assembly 70 includes a four point contact bearing 72, elastomeric O-rings 76, outer washers 78, and inner washers 74. In an exemplary embodiment, preload assembly 70 can be associated with either end of worm shaft 50, based on packaging and assembly considerations of the worm shaft 50 and steering system generally.

In the embodiment shown, four point contact bearing 72 supports worm shaft 50 radially. Four point contact bearing 72 may have an outer race 73 seated against radial support 63 of housing 62 to transmit a radial load. Four point contact bearings 72 may include raceways that are designed to support axial loads in one or both directions in addition to radial loads by allowing four points of angular contact with each ball bearing captured within the raceways. Further, in certain embodiments, four point contact bearing 72 has a low axial lash between the inner race and the outer race to support an axial load of the worm shaft 50 along worm axis 51. Therefore, in certain embodiments, four point contact bearing 72 can receive and support loads in an axial direction. Axial loads include, but are not limited to axial loads received from worm shaft 50, elastomeric O-rings 76, etc. In an exemplary embodiment, four point contact bearing 72 receives axial loads from elastomeric O-rings 76 to support elastomeric O-rings 76, and in certain embodiments, worm shaft 50 axially supported by elastomeric O-rings 76. Advantageously, four point contact bearing 72 can allow for quiet operation.

In an exemplary embodiment, elastomeric O-rings 76 receive an axial load from worm shaft 50 along worm axis 51. In the embodiment shown, protrusions 53 of worm shaft 51 in conjunction with washers 74 and 78 transmit axial loads to elastomeric O-rings 76. The elastomeric O-rings 76 are compressed between protrusions 53 of worm shaft 51 and an inner race of four point contact bearing 72 and between damping retainer 82 and an inner race of four point contact bearing 72.

In an exemplary embodiment, elastomeric O-rings 76 preload worm shaft 50 to prevent or limit axial travel. Elastomeric or damping O-rings 76 can compress and generally deform in response to an axial load to allow axial travel of worm shaft 50, while transmitting the axial load of the worm shaft 50 to the four point contact bearing 72. In certain embodiments, elastomeric O-rings 76 can be compressed, deformed, or deflected a predetermined amount based on material, shape, and treatment of elastomeric O-rings 76. After axial travel of worm shaft 50 exceeds the predetermined amount, axial travel of worm shaft 50 is no longer allowed by the compression of elastomeric O-rings 76. Advantageously, use of elastomeric O-rings 76 allows for axial travel of worm shaft 50 without excessive axial lash of four point contact bearing 72.

Inner washers 74 and outer washers 78 can capture elastomeric O-rings 76. In an exemplary embodiment, elastomeric O-rings 76 are fully captured between worm shaft 50, protrusions 53, inner washers 74, and outer washers 78 and distribute the load to elastomeric O-rings 76. Under high loads, elastomeric O-rings 76 may be hydraulically locked between worm shaft 50, protrusions 53, inner washers 74, and outer washers 78 to prevent further axial travel of worm shaft 50, extrusion of elastomeric O-rings 76, and premature elastomer failure of elastomeric O-rings 76.

In an exemplary embodiment, bearing retainer 80 is utilized to retain preload assembly 70 within housing 62. In an exemplary embodiment, bearing retainer 80 is a beveled retaining ring to prevent the axial movement of four point contact bearing 72 and the entire preload assembly 70. In the embodiment shown, bevel 81 of bearing retainer 80 contacts bearing retaining edge 65 of housing 62. During assembly, four point contact bearing 72 can be inserted into housing 62 and retained in place against bearing support edge 66 and an engaged bearing retainer 80.

In the embodiment shown, the damping retainer 82 is a removable clip to facilitate assembly of preload assembly 70. Damping retainer 82 can allow washers 74 and 78, elastomeric O-rings 76, and four point contact bearing 72 of preload assembly 70 to be inserted onto or slid over worm shaft 50 during assembly. After assembly, damping retainer 82 can be engaged in groove 54 of worm gear 50 to retain preload assembly 70. In the embodiment shown, damping retainer 82 allows for axial loads to be transferred to preload assembly 70 by constraining preload assembly 70 within damping retainer 82 and protrusions 53.

Figure 4:
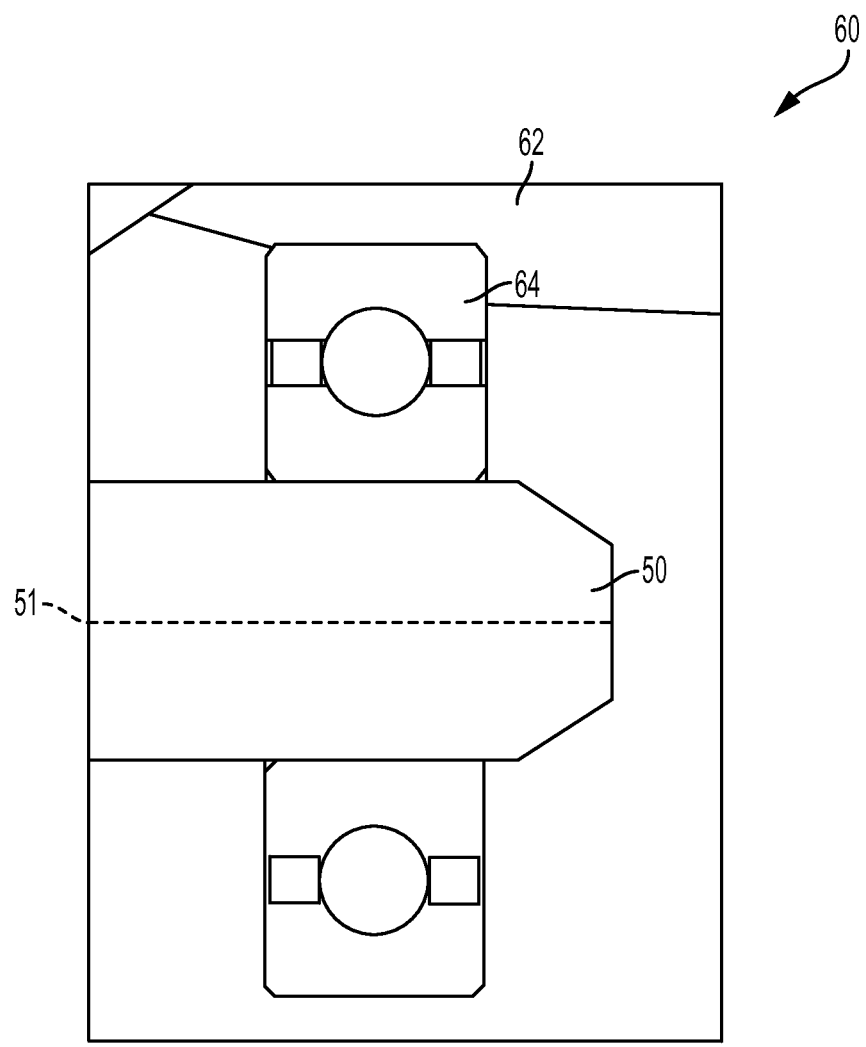
FIG. 4 is a pictorial view of a secondary bearing of the worm shaft subassembly.

FIG. 4 shows secondary bearing 64 on worm shaft 50. In an exemplary embodiment, secondary bearing 64 can be utilized to further support radial loads of worm shaft 50 in conjunction with four point contact bearing 72. Secondary bearing 64 may be press fit against a shoulder of housing 62 to transmit radial loads. In an exemplary embodiment, worm shaft 50 includes no features to transmit axial loads to secondary bearing 64. In certain embodiments, secondary bearing 64 can be located at any suitable location as dictated by packaging and assembly requirements. In the embodiment shown, secondary bearing 64 is a single row deep groove bearing. In other embodiments, secondary bearing 64 can be any suitable bearing such as a needle bearing, etc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A worm shaft subassembly for supporting a worm shaft, the worm shaft having a worm shaft radial load, a worm shaft axial load, and a worm shaft axial travel, the worm shaft subassembly comprising:
   at least one damping member to support the worm shaft axial load, the damping member disposed between an inner washer and an outer washer, one of the inner washer or outer washer comprising an axially-extending portion extending over the damping member radially proximate to and outward of the other of the inner washer or outer washer, the at least one damping member having at least one damping member axial load, wherein the at least one damping member limits the worm shaft axial travel; and
   a four point contact bearing to support the worm shaft radial load and the at least one damping member axial load, the bearing comprising an inner race disposed proximate the worm shaft, an opposing outer race, and a plurality of balls, the balls having two angular points of contact with the inner race and two angular points of contact with the outer race to support the worm shaft radial load and the at least one damping member axial load, wherein the bearing permits the worm shaft axial travel.

2. The worm shaft subassembly of claim 1, wherein deformation of the at least one damping member under the damping member axial load is configured to limit the worm shaft axial travel.

3. The worm shaft subassembly of claim 1, wherein the at least one damping member is configured for deformation sufficient to hydraulically lock the damping member between the worm shaft, inner washer, and outer washer and limit the worm shaft axial travel to a predetermined amount.

4. The worm shaft subassembly of claim 3, wherein the damping member deformation is a non-linear damping member deformation.

5. The worm shaft subassembly of claim 1, wherein the at least one damping member applies a preload to the worm shaft.

6. The worm shaft subassembly of claim 1, wherein the at least one damping member includes at least one elastomeric O-ring.

7. The worm shaft subassembly of claim 6, wherein the at least one elastomeric O-ring is configured to be hydraulically locked between the worm shaft, inner washer, and outer washer.

8. The worm shaft subassembly of claim 1, further comprising a damping member retaining member to retain the at least one damping member.

9. The worm shaft subassembly of claim 1, further comprising a bearing retaining member to retain the bearing.

10. The worm shaft subassembly of claim 1, further comprising a secondary bearing to support the worm shaft radial load.

11. A method for supporting a worm shaft, the worm shaft having a worm shaft radial load, a worm shaft axial load, and a worm shaft axial travel, the method comprising:
   supporting the worm shaft axial load via at least one damping member, the damping member disposed between an inner washer and an outer washer, one of the inner washer or outer washer comprising an axially-extending portion extending over the damping member radially proximate to and outward of the other of the inner washer or outer washer;
   limiting the worm shaft axial travel via the at least one damping member;
   supporting at least one damping member axial load via a four point contact bearing, the bearing comprising an inner race disposed proximate the worm shaft, an opposing outer race, and a plurality of balls, the balls having two angular points of contact with the inner race and two angular points of contact with the outer race to support the worm shaft radial load and the worm shaft axial load;
   supporting the worm shaft radial load via the bearing; and
   permitting the worm shaft axial travel via the bearing.

12. The method of claim 11, further comprising supporting the worm shaft radial load via a secondary bearing.

13. The method of claim 11, further comprising deforming the at least one damping member between the inner washer and outer washer in response to the worm shaft axial load, wherein deformation of the at least one damping member under the worm shaft axial load is configured to limit the worm shaft axial travel.

14. The method of claim 13, wherein the at least one damping member is configured for deformation sufficient to hydraulically lock the damping member between the worm shaft, inner washer, and outer washer and limit the worm shaft axial travel to a predetermined amount.

15. The method of claim 11, wherein the at least one damping member includes at least one elastomeric O-ring.

16. An electric power steering system comprising:
   a steering shaft connected to a handwheel at one end and a rack and pinion steering mechanism at an opposite end;
   a steering assist unit comprising an electric motor operated by a controller and driving a worm shaft and a worm gear interposed between said worm shaft and said steering shaft, said worm shaft having worm teeth, a worm shaft radial load, a worm shaft axial load, and a worm shaft axial travel, and said worm gear fitted on said steering shaft;
   the worm shaft including a worm shaft subassembly comprising:
   at least one damping member to support the worm shaft axial load, the damping member disposed between an inner washer and an outer washer, one of the inner washer or outer washer comprising an axially-extending portion extending over the damping member radially proximate to and outward of the other of the inner washer or outer washer, the at least one damping member having at least one damping member axial load, wherein the at least one damping member limits the worm shaft axial travel; and
   a four point contact bearing to support the worm shaft radial load and the at least one damping member axial load, the bearing comprising an inner race disposed proximate the worm shaft, an opposing outer race, and a plurality of balls, the balls having two angular points of contact with the inner race and two angular points of contact with the outer race to support the worm shaft radial load and the at least one damping member axial load, wherein the bearing permits the worm shaft axial travel.

17. The electric power steering system of claim 16, the worm shaft subassembly further comprising a secondary bearing to support the worm shaft radial load.

18. The electric power steering system of claim 16, wherein deformation of the at least one damping member under the damping member axial load is configured to limit the worm shaft axial travel.

19. The electric power steering system of claim 18, wherein the at least one damping member is configured for deformation sufficient to hydraulically lock the damping member between the worm shaft, inner washer, and outer washer and limit the worm shaft axial travel to a predetermined amount.

20. The electric power steering system of claim 16, wherein the at least one damping member includes at least one elastomeric O-ring.

* * * * *